(12) United States Patent
Bergeson et al.

(10) Patent No.: US 10,375,201 B2
(45) Date of Patent: *Aug. 6, 2019

(54) IDENTITY AND POLICY ENFORCED INTER-CLOUD AND INTRA-CLOUD CHANNEL

(71) Applicant: Micro Focus Software Inc., Wilmington, DE (US)

(72) Inventors: Bruce L. Bergeson, American Fork, UT (US); Carolyn B. McClain, Springville, UT (US); Stephen R Carter, Spanish Fork, UT (US); Vernon Roger Holm, Sandy, UT (US)

(73) Assignee: Micro Focus Software Inc., Wilmington, DE (US)

( * ) Notice: Subject to any disclaimer, the term of this patent is extended or adjusted under 35 U.S.C. 154(b) by 262 days.

This patent is subject to a terminal disclaimer.

(21) Appl. No.: 15/234,853

(22) Filed: Aug. 11, 2016

(65) Prior Publication Data
US 2016/0352862 A1 Dec. 1, 2016

Related U.S. Application Data

(63) Continuation of application No. 14/448,521, filed on Jul. 31, 2014, now Pat. No. 9,438,692, which is a (Continued)

(51) Int. Cl.
*H04L 29/08* (2006.01)
*G06F 9/50* (2006.01)
(Continued)

(52) U.S. Cl.
CPC ............ *H04L 67/32* (2013.01); *G06F 9/5061* (2013.01); *G06F 21/606* (2013.01);
(Continued)

(58) Field of Classification Search
CPC ...................................................... H04L 67/32
See application file for complete search history.

(56) References Cited

U.S. PATENT DOCUMENTS

| 6,880,002 | B2 | 4/2005 | Hirschfeld et al. |
| 7,000,006 | B1 * | 2/2006 | Chen ................... H04L 63/0263 370/252 |

(Continued)

OTHER PUBLICATIONS

Bernstein, et al., "Blueprint for the Intercloud—Protocols and Formats for Cloud Computing Interoperability", 2009, 4th Int. Conference on Internet and Web Apps and services, pp. 328-336. (Year: 2009).*

(Continued)

*Primary Examiner* — William S Powers
(74) *Attorney, Agent, or Firm* — Schwegman Lundberg & Woessner, P.A.

(57) ABSTRACT

Techniques for identity and policy enforced cloud communications are presented. Cloud channel managers monitor messages occurring within a cloud or between independent clouds. Policy actions are enforced when processing the messages. The policy actions can include identity-based restrictions and the policy actions are specific to the messages and/or clouds within which the messages are being processed.

20 Claims, 10 Drawing Sheets

Related U.S. Application Data continuation of application No. 12/727,048, filed on Mar. 18, 2010, now Pat. No. 8,806,566.

(60) Provisional application No. 61/262,751, filed on Nov. 19, 2009.

(51) Int. Cl.
  *G06F 21/60* (2013.01)
  *H04L 12/24* (2006.01)
  *H04L 29/06* (2006.01)

(52) U.S. Cl.
  CPC ........ *H04L 41/0893* (2013.01); *H04L 63/102* (2013.01); *H04L 67/10* (2013.01); *H04L 67/30* (2013.01)

(56) References Cited

U.S. PATENT DOCUMENTS

| | | | |
|---|---|---|---|
| 7,200,676 B2* | 4/2007 | Christensen | H04L 29/06 709/203 |
| 7,373,394 B1 | 5/2008 | Li et al. | |
| 7,610,390 B2* | 10/2009 | Yared | G06F 21/41 709/227 |
| 7,646,872 B2* | 1/2010 | Brown | H04L 63/061 380/277 |
| 8,806,566 B2 | 8/2014 | Bergeson et al. | |
| 2005/0149545 A1* | 7/2005 | Zenz | G06Q 10/06 |
| 2008/0080526 A1 | 4/2008 | Gounares et al. | |
| 2008/0091613 A1 | 4/2008 | Gates, III et al. | |
| 2008/0104393 A1 | 5/2008 | Glasser et al. | |
| 2009/0300607 A1 | 12/2009 | Ferris et al. | |
| 2010/0027552 A1 | 2/2010 | Hill | |
| 2011/0119729 A1 | 5/2011 | Bergeson et al. | |
| 2014/0365656 A1 | 12/2014 | Bergeson et al. | |

OTHER PUBLICATIONS

Cui, et al., "Grid Gateway: Message-Passing betweeen Separated Cluster Interconnects," Grid and Cooperative Computing, Springer-Verlag, 2004. (Year: 2004).*
U.S. Appl. No. 12/727,048, Non Final Office Action dated Aug. 9, 2012, 18 pgs.
U.S. Appl. No. 12/727,048, Response filed Nov. 9, 2012 to Non Final Office Action dated Aug. 9, 2012, 10 pgs.
U.S. Appl. No. 12/727,048, Non-Final Office Action dated Mar. 7, 2013, 21 pgs.
U.S. Appl. No. 12/727,048, Response filed May 10, 2013 to Final Office Action dated Mar. 7, 2013, 9 pgs.
U.S. Appl. No. 12/727,048, Non Final Office Action dated Jun. 26, 2013, 21 pgs.
U.S. Appl. No. 12/727,048 mailed on Sep. 26, 2013, 10 pgs.
U.S. Appl. No. 12/727,048, Final Office Action dated Oct. 23, 2013, 23 pgs.
U.S. Appl. No. 12/727,048 , Response filed Dec. 23, 2013 to Final Office Action dated Oct. 23, 2013, 11 pgs.
U.S. Appl. No. 12/727,048, Advisory Action dated Jan. 6, 2014, 3 pgs.
U.S. Appl. No. 12/727,048, Notice of Allowance dated Apr. 2, 2014, 8 pgs.
U.S. Appl. No. 14/448,521, Preliminary Amendment filed Aug. 7, 2014, 3 pgs.
U.S. Appl. No. 14/448,521, Supplemental Preliminary Amendment filed Aug. 25, 2014, 7 pgs.
U.S. Appl. No. 14/448,521, Non Final Office Action dated Mar. 18, 2015, 15 pgs.
U.S. Appl. No. 14/448,521, Response filed Jun. 18, 2015 to Non Final Office Action dated Mar. 18, 2015, 9 pgs.
U.S. Appl. No. 14/448,521, Final Office Action dated Jul. 6, 2015, 17 pgs.
U.S. Appl. No. 14/448,521, Response filed Sep. 8, 2015 to Final Office Action dated Jul. 6, 2015, 10 pgs.
U.S. Appl. No. 14/448,521, Advisory Action dated Sep. 17, 2015, 3 pgs.
U.S. Appl. No. 14/448,521, Response filed Oct. 12, 2015 to Final Office Action dated Jul. 6, 2015, 11 pgs.
U.S. Appl. No. 14/448,521, Non Final Office Action dated Nov. 10, 2015, 6 pgs.
U.S. Appl. No. 14/448,521, Response filed Feb. 10, 2016 to Non Final Office Action dated Nov. 10, 2015, 7 pgs.
U.S. Appl. No. 14/448,521, Final Office Action dated Feb. 26, 2016, 6 pgs.
U.S. Appl. No. 14/448,521, Response filed Apr. 29, 2016 to Final Office Action dated Feb. 26, 2016, 7 pgs.
U.S. Appl. No. 14/448,521, Notice of Allowance dated May 18, 2016, 8 pgs.
"European Application No. 10191966.0, Summons to Attend Oral Proceedings mailed Jan. 18, 2013", 9 pgs.
"European Application Serial No. 10191966, Extended European Search Report dated Jun. 8, 2011", 11 pgs.
"European APplication Serial No. 10191966.0, Office Action Response Filed Oct. 17, 2012", 19 Pgs.
Bernstein, David, et al., "Blueprint for the Intercloud—Protocols and Formats for Cloud Computing Interoperability", 2009 Fourth International Conference on Internet and Web Applications and Services, XPO31473536, IEEE, Piscataway, NJ, USA, ISBN: 978-1-4244-3851-8, (May 24, 2009), 328-336.
Cui, Wei, et al., "Grid Gateway: Message-Passing between Separated Cluster Interconnects", Grid and Cooperative Computing (Lecture Notes in Computer Science, LNCS), Springer-Verlag, Berlin/Heidelberg, XP019004628, ISBN: 978-3-540-21988-0 [online] http://cs.nju.edu.cn/gchen/paper/gcc2003/pdf/074, (Apr. 17, 2004), 724-31.
Hommel, Wolfgang, et al., "Zielorientierte Datenmodellierung fur Itil-Basierte Inter-Organisationale Configuration Management Databases", [online] Retrieved from the Internet: http://aisel.aisnet.org Proceedings 2009. Paper 62; XP-002635029, (Sep. 1, 2009), 695-704.
Ranjan, R, "Decentralized Overlay for Federation of Enterprise Clouds", The University of Melbourne, Australia XP0007915821, (Jan. 1, 2010), 191-217.

* cited by examiner

IDENTITY AND POLICY ENFORCED INTER-CLOUD AND INTRA-CLOUD CHANNEL

RELATED APPLICATIONS

The present application is a continuation of U.S. patent application Ser. No. 14/448,521, filed on Jul. 31, 2014, which is a continuation of U.S. patent application Ser. No. 12/727,048, filed Mar. 18, 2010, now issued as U.S. Pat. No. 8,806,566, which is a non-provisional application of, and claims the benefit of priority under 35 U.S.C. 119(e) to, U.S. Provisional Application Ser. No. 61/262,751, filed on Nov. 19, 2009, and entitled: "Identity and Policy Enforced Inter-Cloud and Intra-Cloud Channel;" each disclosure of which is incorporated by reference in its entirety herein.

BACKGROUND

Cloud computing is rapidly changing the Internet into a collection of clouds, which provide a variety of computing resources, storage resources, and, in the future, a variety of resources that are currently unimagined. One of the problems that are yet to be conquered in this emerging world of multiple clouds is the mechanism by which various cloud processes will communicate either intra- or inter-cloud in order to achieve the services that the consumer will expect.

SUMMARY

Techniques for identity and policy enforced intra-cloud and inter-cloud communications are presented. More particularly, and in an embodiment, a method for managing policy-based messages for a cloud computing environment is described. A first process is configured within a first cloud computing environment to manage select messages occurring within a communication channel of the first cloud computing environment. The first cloud computing environment is instantiated with the first process executing therein. Finally, the first process enforces selective policy restrictions based on the select messages that enter and exit the communication channel.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "cloud computing environment" refers to a self-contained processing environment that includes physical and logical resources that are dispersed over a network, such as the Internet. The distributed nature of the cloud computing environment is abstracted and obscured from principals (users and automated services) of the cloud computing environments.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-12.

Figure 1:
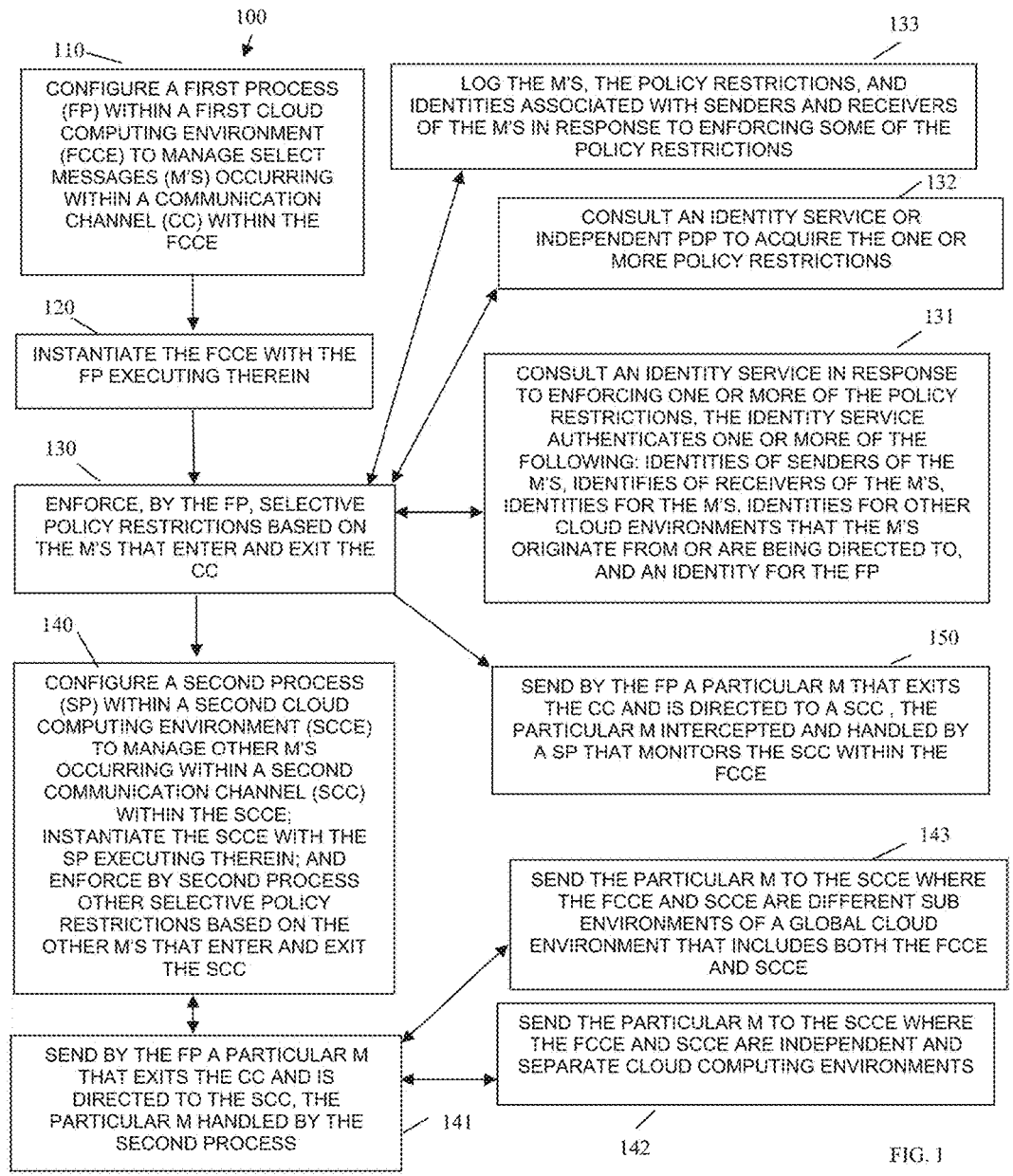
FIG. 1 is a diagram of a method for cloud communications, according to an environment, according to an example embodiment.

FIG. 1 is a diagram of a method 100 for cloud communications, according to an environment, according to an example embodiment. The method 100 (hereinafter "cloud configurator service") is implemented in a machine-accessible and non-transitory computer-readable medium as instructions that execute on one or more processors (machines, computers, processors, etc.). The machines are specifically configured to process the cloud configurator service. Furthermore, the cloud configurator service is operational over and processes within a network. The network may be wired, wireless, or a combination of wired and wireless. In an embodiment, the network is the Internet.

At 110, the cloud configurator service configures a first process (service or resource) within a first cloud computing environment (FCCE). This is done so the first process can manage select messages occurring within a communication channel within the FCCE. Example configuration information and an example configuration database for achieving the configuration is presented below with the discussion of the FIG. 4.

In an embodiment, some of the messages are parameters directed to an executable process within the FCCE and used by that process to perform some data manipulation and perhaps generate some output. In other cases, the messages are actions or instructions that are to be performed. In still other cases, the messages are notifications or informational messages. It is noted that the messages can be a combination of these things and other things. So, a message is a communication of information.

At 120, the cloud configurator service instantiates the FCCE with the first process executing within the FCCE.

The communication channel is logically constructed within the FCCE based on an identifier associated with the messages. In another case, events of defined types can logically define the communication channel. In yet another situation, a defined logical port can be defined for identifying the select messages of the communication channel. The first process manages the communication channel.

It is also noted that although a single channel is described for purposes of illustrating the FIG. 1, the embodiments of the invention are not so limiting. That is, multiple channels that carry different types of monitored messages can exist within the FCCE. Example types of channels are presented in detail below with reference to the FIGS. 4-12.

Additionally, the communication channel can be resolved and defined in a variety of manners. For example, the communication channel may be defined in a configuration specification that is dynamically accessed to resolve the communication channel. In another instance, the communication channel can be calculated from information included in the configuration file. In still another situation, the communication channel can be defined, identified, and communicated via another different communication channel that is used for communication other than the communication channel that is to be monitored. The communication channel may also be identified via a processing parameter.

It is also noted that the first process can be configured to dynamically and on the fly (real time) manage other communication channels besides the communication channel discussed herein.

At 130, the cloud configurator service causes (via the initiation of the first process within the FCCE) the first process to enforce selective policy restrictions based on the selective messages that enter and exit the communication channel that the first process is configured to monitor and manage.

According to an embodiment, at 131, the cloud configurator service causes the first process (during its execution) to consult an identity service in response to enforcing the one or more policy restrictions. The identity service authenticates one or more of the following: identities of senders of the messages, identities of receivers of the messages, identities for the messages, identities for other cloud computing environments that the messages originate from or are being directed to, and/or an identity for the first process.

In another case, at 131, the cloud configurator service causes the first process to consult an identity service for purposes of acquiring the one or more policy restrictions that are enforced by the first process at 130. In this embodiment, the identity service serves as a Policy Decision Point (PDP) that is configured to provide policy disposition to the first process. The first process acts as a Policy Enforcement Point (PEP). In an alternative situation, at 131 the cloud configurator service causes the first process to consult an independent PDP and policy specification store to acquire policy decisions and the first process also acts as the PEP in this scenario.

In another scenario, at 132, the cloud configurator service causes the first process to log the messages, the policy restrictions, and identities associated with senders and receivers of the messages. This consultation is forced in response to or based on enforcement of the policy restrictions.

In an embodiment, at 140, the cloud configurator service configures a second process within a second cloud computing environment for purposes of causing the second process to manage other messages occurring within a second communication channel of the second cloud computing environment. The cloud configurator service also causes the second process to be initiated within the second cloud computing environment and thereby causes the second process to enforce other selective policy restrictions based on the other messages that enter and/or exit the second cloud computing environment. So, the cloud configurator service can configure multiple cloud computing environments with multiple instances of the first process (such as the second process and others for other cloud environments) for monitoring multiple different communication channels.

Continuing with the embodiment of 140 and at 141, the cloud configurator service causes, via the configuration and instantiation of the first process, the first process to send a particular message that exits the communication channel of the FCCE to the second process. So, inter-cloud communication occurs via the first process sending the particular message to the second process and this act of sending is done in response to evaluation or enforcement of the policy restrictions. This inter cloud communication has a variety of benefits and uses, some of which are described below with reference to the FIGS. 4-12.

Continuing with the embodiment of 141 and at 142, the cloud configurator service causes the first process to send the particular message to the second cloud computing environment where the first and second cloud computing environments are independent and separate cloud computing environments (as mentioned above this is inter-cloud communication).

Similarly, continuing with the embodiment of 141 and at 142, the cloud configurator service causes the first process to send the particular message to the second cloud computing environment where the first and second cloud computing environments are different sub environments of a global cloud computing environment. The global cloud computing environment includes the FCCE and the second cloud computing environment. Examples of this are presented below with reference to the FIGS. 11 and 12. In still another case, the communication occurring between the clouds may be performed by a process other than the first process but is still governed by policy specifications as is the first process.

In still another situation, at 150, the cloud configurator service causes the first process to send a particular message that exits the communication channel and that is directed to the second communication channel. The particular message is intercepted and handled by a second process that monitors the second communication channel within the FCCE. Here, this is cross-channel communication within a single cloud environment (intra-cloud and cross-channel communication).

Figure 2:
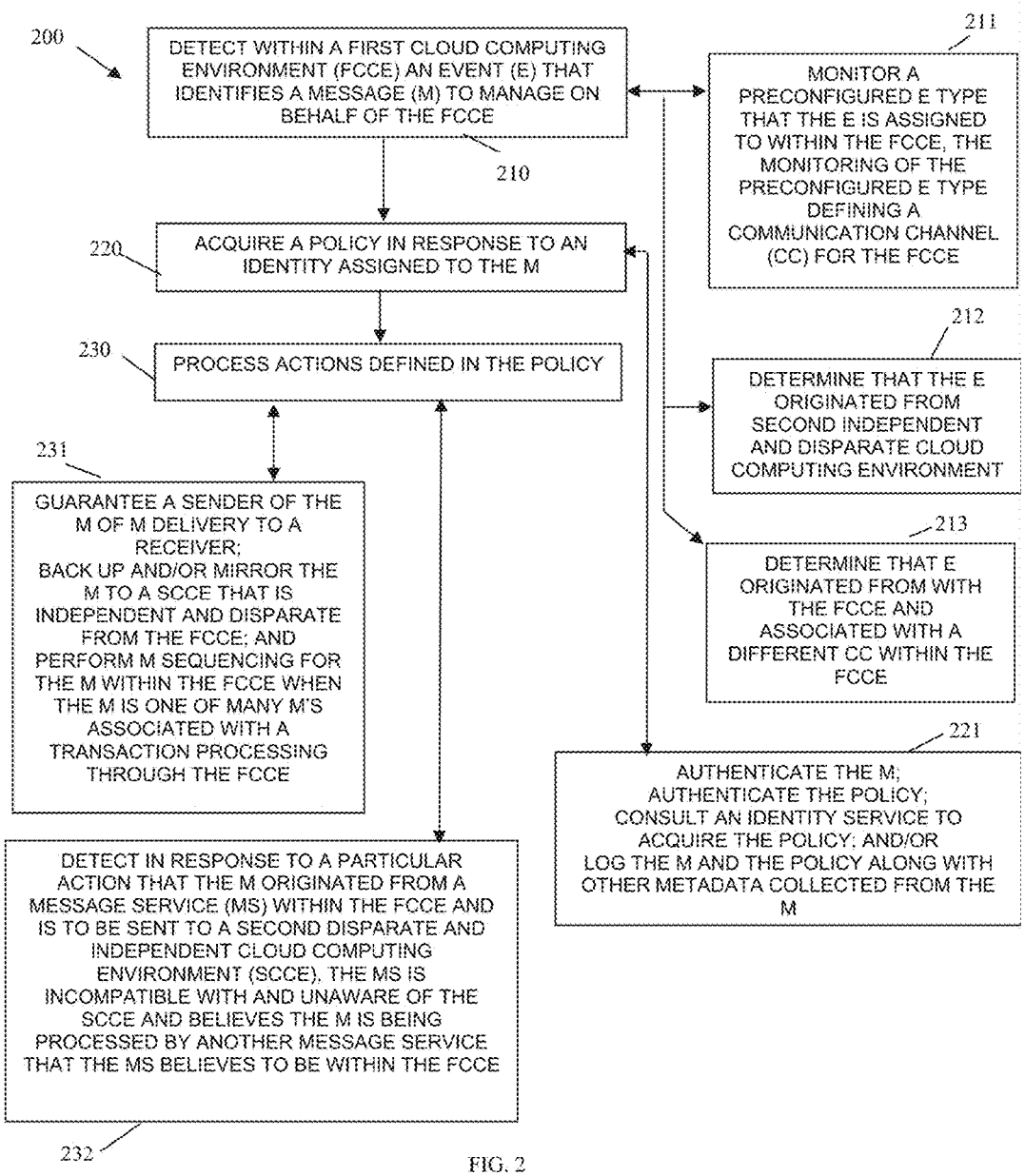
FIG. 2 is a diagram of another method for cloud communications, according to an environment, according to an example embodiment.

FIG. 2 is a diagram of another method 200 for cloud communications, according to an environment, according to an example embodiment. The method 100 (hereinafter "cloud channel manager service") is implemented in a machine-accessible and non-transitory computer-readable medium as instructions that execute on one or more processors (machines, computers, processors, etc.). The machine is specifically configured to process the cloud channel manager service. Furthermore, the cloud channel manager service is operational over and processes within a network. The network may be wired, wireless, or a combination of wired and wireless. In an embodiment, the network is the Internet.

The cloud configurator service represented by the method 100 of the FIG. 1 is presented from the perspective of a service that initially configures clouds for the policy-based communications described herein. The cloud channel manager service is presented from the perspective of a service that is internal to one of the initiated cloud computing environments and that handles specific channel communications within the cloud computing environment. In this sense, the first and second processes described with the cloud configurator service are expanded upon herein and below by describing the cloud channel manager service of the FIG. 2.

At 210, the cloud channel manager service detects, within a FCCE, an event that identifies a message to manage on behalf of the FCCE. Thus, the cloud channel manager service can be viewed as the first and second processes described above with reference to the method 100 of the FIG. 1.

According to an embodiment, at 211, the cloud channel manager service monitors a configured event type that the event is assigned to within the FCCE. The monitoring of the configured event type defines a configured communication channel. In other words, event monitor for specific event types logically defines the configured communication channel. It is noted that other techniques can be used as well, such as defining a specific logical port for the event and/or message and monitoring that port.

In an embodiment, at 212, the cloud channel manager service determines that the event originated from a second independent and disparate cloud computing environment. So, inter-cloud communication is occurring based on the detected event at 210.

In an alternative situation, at 213, the cloud channel manager service determines that the event originated from within the FCCE and is associated with a different communication channel being monitored separately within the FCCE. This is an example of inter-cloud communication across multiple disparate communication channels.

At 220, the cloud channel manager service acquires a policy in response to or based on an identity assigned to the message or associated via metadata to the message.

In an embodiment, at 221, the cloud channel manager service authenticates the message, authenticates the policy, consults an identity service to acquire the policy, and/or logs the message and the policy along with other metadata collected from the message. Other metadata can include such things as date and time, resource identifiers or identities, actions taken, etc.

At 230, the cloud channel manager service processes actions defined in the policy. So, the policy identifies conditions that are evaluated based on the event and the message and when conditions are satisfied or are not satisfied defined actions are taken. The actions are defined with the policies.

According to an embodiment, at 231, the cloud channel manager service can perform a variety of actions, such as but not limited to: guaranteeing a sender of the message of message delivery to a desired receiver of the message, backing up or mirroring the message to a second independent cloud computing environment, and/or performing message sequencing for the message within the FCCE when the message is one of many messages associated with a transaction processing through the FCCE.

In another situation, at 232, the cloud channel manager service detects in response to a particular action that the message originated from a message service within the FCCE and is to be send to a second disparate and independent cloud computing environment. The message service is incompatible with and unaware of the second cloud computing environment and believes the message is being processed by a another message service that the original message service believes to be within the FCCE. This provides a variety of benefits, such as using the cloud channel manager service to proxy operations from the FCCE to a second independent cloud computing environment. So, failover is possible, backups are possible, and/or load balancing is possible and all this is achieved transparently to the message service. That is, the message service can be a legacy service not pre-configured to interact with other clouds and yet this legacy service is interoperable with other clouds via the mechanism provided by the cloud channel manager service.

Figure 3:
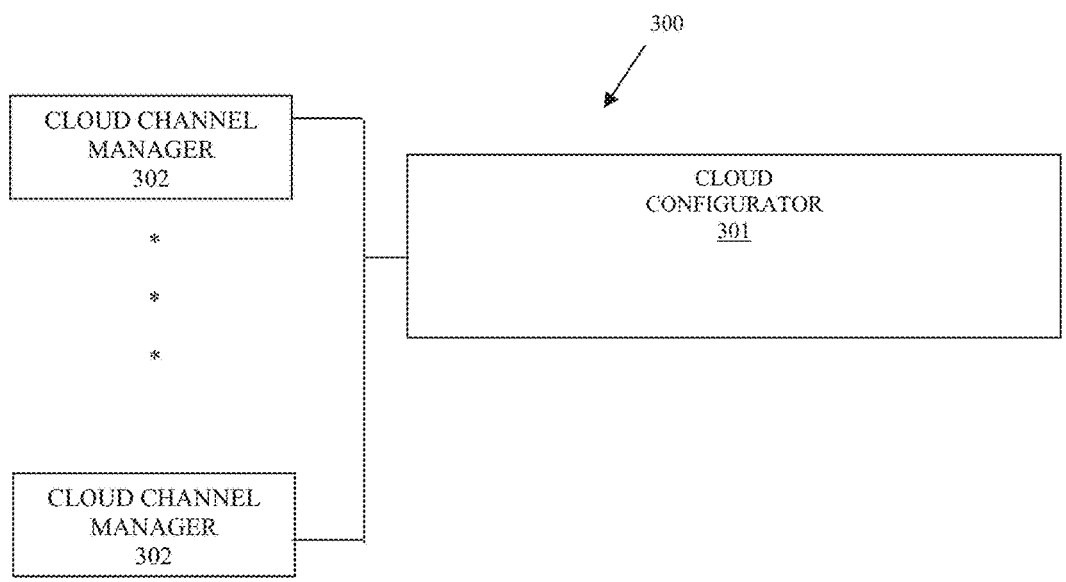
FIG. 3 is a diagram of a cloud communication system, according to an example embodiment.

FIG. 3 is a diagram of a cloud communication system 300, according to an example embodiment. The cloud communication system 300 is implemented in a machine-accessible and non-transitory computer-readable medium as instructions that execute on multiple processors (machines, computers, processors, etc.). The machines are specifically configured to process the cloud communication system 300. Furthermore, the cloud communication system 300 is operational over and processes within a network. The network may be wired, wireless, or a combination of wired and wireless. In an embodiment, the network is the Internet.

The cloud communication system 300 includes a cloud configurator 301 and a plurality of cloud channel managers 302. Each of these components and their interactions with one another will now be described below in turn.

The cloud configurator 301 is configured on a first processor. The first processor is configured to execute the cloud configurator 301, which is executable instructions residing on the first processor in a non-transitory computer or machine-readable storage format. Example processing associated with the cloud configurator 301 was presented in detail above with reference to the method 100 of the FIG. 1.

The cloud configurator 301 is configured to instantiate multiple cloud computing environments. Each cloud computing environment having one or more of the cloud channel managers.

In an embodiment, the cloud configurator 301 is also configured to instantiate each cloud computing environment in response to global configuration restrictions that are global to all the cloud computing environments and simultaneously to instantiate each cloud computing environment in response to local configuration restrictions that are specific to each particular cloud computing environment. So, there is a hierarchal enforcement of configuration restrictions with the global restrictions taking priority if dictated by another policy. In other words, some global restrictions can override conflicting or missing locale restrictions and some global restrictions can take a back seat to higher priority local restrictions that are in conflict with the global restrictions. Thus, a hierarchy of configurations requirements are enforced for each level of the hierarchy having priority attributes, such that some times higher level requirements take precedence over lower requirements and vice versa.

According to an embodiment, the cloud configurator 301 is also configured to instantiate each cloud computing environment with its own independent identity service that performs authentication services within that particular cloud computing environment. It may also be that the cloud configurator 301 configures some cloud computing environments to externally use and consult a global identity service. Additionally, the cloud configurator 301 may be configured to instantiate each cloud computing environment with its own PDP that performs policy decisions. Again, each cloud computing environment may also be configured to consult with external or global PDP's.

Each cloud channel manager 302 is configured to execute on one or more second processors. That is, one or more second processors are specifically configured to execute one or more of the cloud channel managers 302. Each cloud channel manager 302 residing in a non-transitory computer or machine-readable storage medium. Example aspects of the cloud channel managers 302 were shown in detail above with reference to the methods 100 and 200 of the FIGS. 1 and 2, respectively.

Each cloud channel manager 302 is configured to handle inbound and outbound messages occurring over a particular communication channel (each channel logically defined via message types, event types, and/or specific port numbers). Within each cloud, policy and identity-based restrictions are enforced by that cloud's cloud channel manager 302 or cloud channel managers 302. The policy and identity-based restrictions are enforced for each inbound and outbound message processed by each cloud channel manager 302.

According to an embodiment, each cloud channel manager 302 is configured to monitor, log, and/or audit the inbound and outbound messages occurring within its cloud's communication channel.

Figure 4:
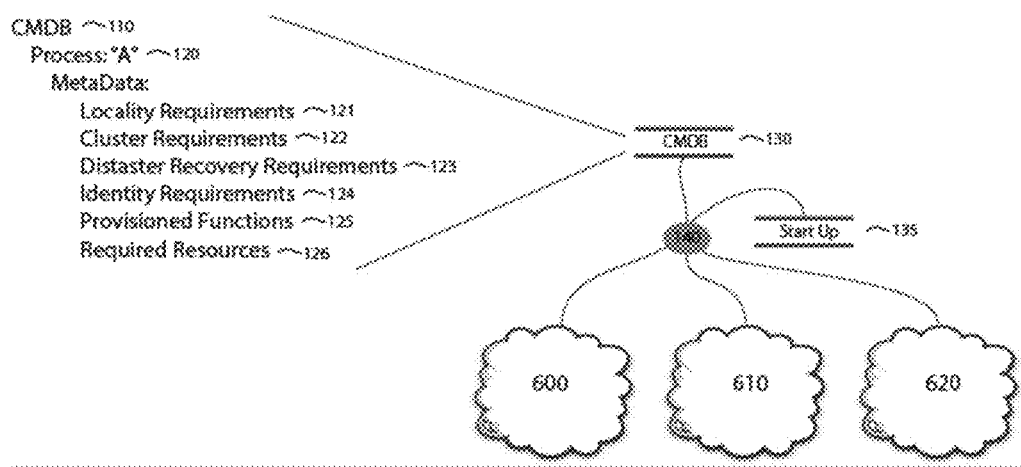
FIG. 4 depicts an example overview of instantiating a cloud environment, according to an example embodiment.

FIG. 4 depicts an example overview of instantiating a cloud environment, according to an example embodiment.

Today's best practice is described by Information Technology Infrastructure Library (ITIL) and embodiments of the invention will use such terminology. However, any best practice that describes how to describe and control a configuration of infrastructure and/or data centers could be used profitably by the embodiments of the invention.

Embodiments begin with a Configuration Management Database (CMDB) at 110, the processes and/or resources are described within 110 at 120 by describing the processes/resource as a collection of metadata. The metadata is a collection of locality requirements at 121, cluster requirements at 122, disaster recovery requirements at 123, identity requirements at 124, provisioned functions at 125, and required resources at 126. Other resources can be described within the CMDB such as storage and network but it suffices to describe something as complex as a process (service) for the purposes of describing various embodiments of the invention in that a process is sufficiently complex to allow embodiments of the invention to show the manipulation of such complexity.

Locality requirements, at 121, include the requirement of a process concerning locality operational characteristics, such as where the process might be required to run within some geographic area. Geographic locality is only one type of locality that may be specified but it serves the purpose of illustration for the description of the embodiments of the invention (other locality specifications might include subnet).

Cluster requirements, at 122, include the requirements of a process as a member of a cluster. This includes the operational characteristics of a particular process as it is a member of the cluster including the sharing of information, failover, and other clustering characteristics.

Disaster recovery requirements, at 123, include the requirements of the process as a participant in a disaster recovery mechanism. This includes the operational characteristics that are described for a process of the participant as an active element or passive element in some kind of disaster recovery mechanism that is implemented should there be a natural or man-made, etc. disaster that requires some kind of response in order to keep infrastructure or data processing mechanisms (or other automated or electronic mechanisms) functioning properly.

Identity requirements, at 124, include the requirements for identity including the policies that are enforced as an identity is assigned to the process including the requirements for verifying that the validity of the process (e.g., verifying the digital signature of the executable to verify that the executable had not been tampered with) so that the identity is trusted at some level of assurance.

Provisioned functions, at 125, include a description of functions provided by the process being described at 120. The purpose of provisioned functions, at 125, is to allow other processes to query this process or processes that provide a directory of functions and their locations to find out what functions are available from the process being described so that after instantiation the other processes can expect to receive services rendered by the provisioned functions of the process being described. Such functions might include: identity provisioning, auditing, federation, proxy, workflow, storage, identity injection, etc.

Required resources, at 126, include a description of the resources required by the process in order for the process to function correctly. This includes a description of the minimum resources (e.g., CPU, memory, local storage, cache storage, etc.), optimal resources, and maximal resources (the purpose of this would be to advise any start up mechanism that resources beyond this point will not be used and therefore are wasted if assigned).

Other metadata can also be specified to describe the process or other resources that are described in the CMDB.

The CMDB is shown schematically, at 130 in the FIG. 4 and is accessed by process 140, which accesses a start up script, at 135, (or some kind of a start up specification that describes how the infrastructure (described herein) should the instantiated). This allows the process, at 140, to cause various aspects of the invention to be instantiated in various clouds shown at 600, 610, and 620.

Figure 5:
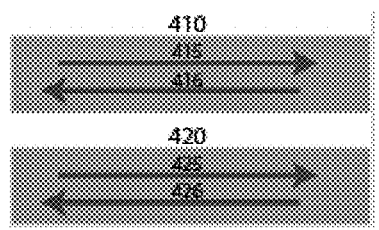
FIG. 5 depicts an example overview of communication channels within cloud environments, according to an example embodiment.

FIG. 5 depicts an example overview of communication channels within cloud environments, according to an example embodiment.

The FIG. 5 shows a simplified diagram of the communication channel described herein. The communication channel is comprised of two major parts 410: Request-Confirm and 420: Indication-Response hereinafter referred to as 410 and 420. Within 410 there are two basic channels 415: Request and 416: Confirmed, hereinafter referred to as 415 and 416, 415 is used to send requests to processes that are participating in the communication channel, at 416, and is used for those processes to confirm their compliance or noncompliance with the request. A response on 416 is required after a request on 415. Similar to 410 is the 420 channel; 425: Indication and 426: Response are the subject of. In this case processes are providing an indication of their operational status, health, and other operational status as a non-required response can be posted on 426 by the receiving process.

Figure 6:
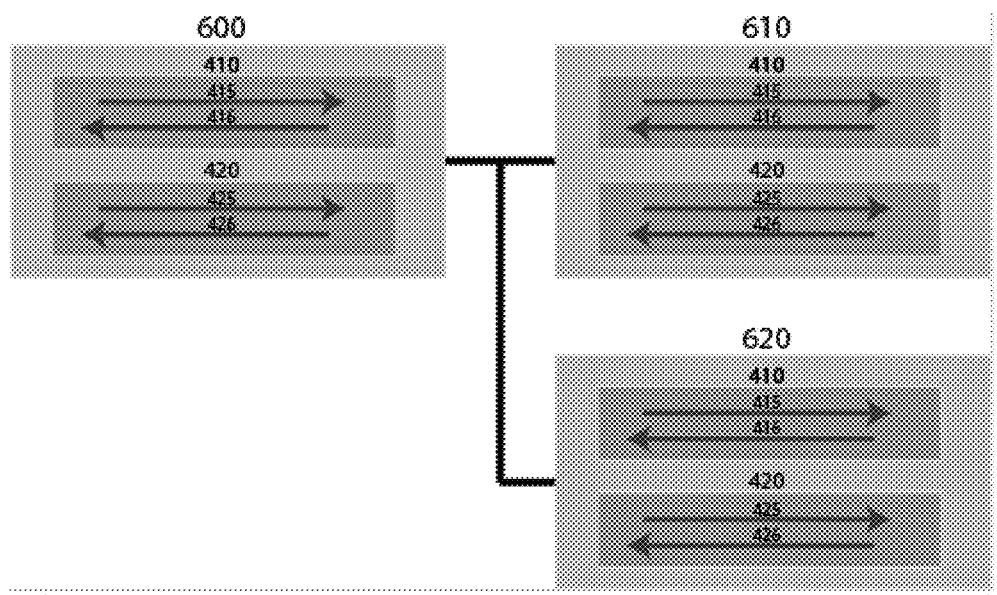
FIG. 6 depicts an example overview of linking multiple cloud environments together with one another, according to an example embodiment.

FIG. 6 depicts an example overview of linking multiple cloud environments together with one another, according to an example embodiment.

Specifically, the FIG. 6 shows a diagram of how the three clouds (discussed earlier in the FIGS. 4-5) are linked together.

Figure 7:
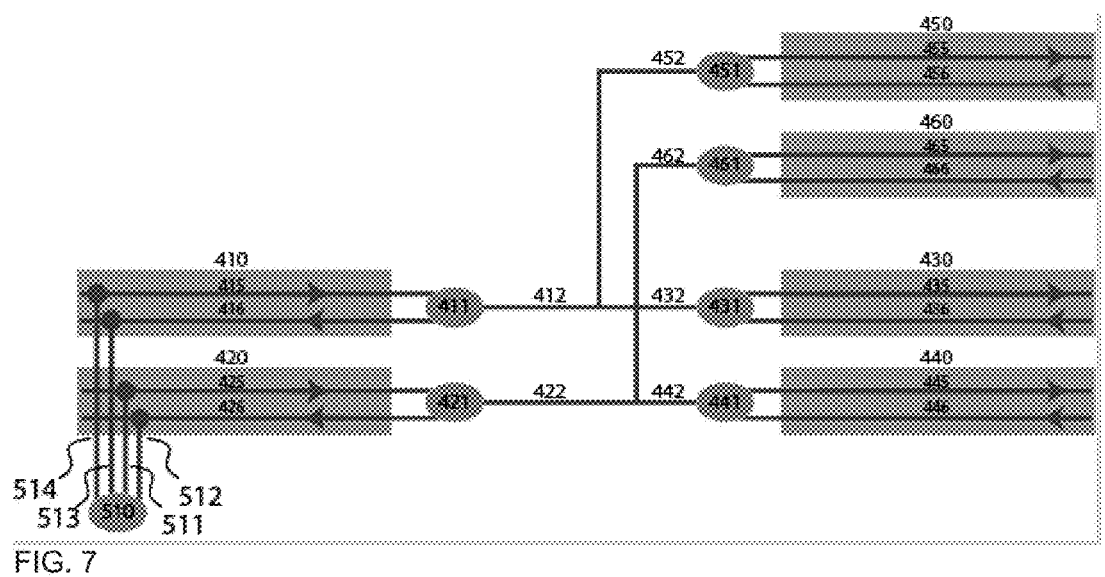
FIG. 7 depicts an example overview of linked cloud environments of the FIGS. 5-6, according to an example embodiment.

More particularly, the FIG. 7 shows more detail concerning the FIG. 6. The process 510 is a generic process intended to represent any process that wishes to participate with the communication channels proposed by the invention. Each such process represented by 510 connect to the sub channels at 410 and 420 via connectors 511, 512, 513, and 514. Each of the processes 411, 421, 431, 441, 451, and 461, manage the ingress and egress of messages to and from the cloud and channel that they manage. In an embodiment, there may be many channels (e.g., 410, 420) within the cloud. In an embodiment there may be channels in many clouds (e.g., 410, 420, 430, 440, 450, 460). In either case, the particular 411 and 421 or their representative counterparts in other clouds or other channel pairs control the ingress and egress of messages to and from the sub channels of the channels that they are managing.

Figure 8:
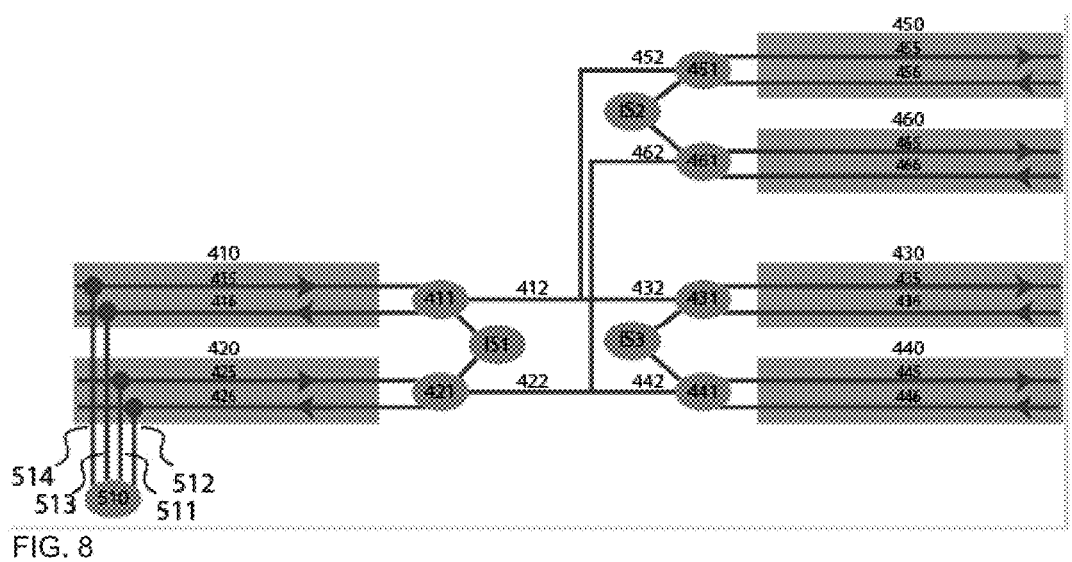
FIG. 8 depicts integration of identity services into components of the architecture, according to an example embodiment.

Embodiments of the invention further provide for an identity service captioned here as IS1, IS2, and IS3 in the diagram shown in the FIG. 8. IS1, IS2, and IS3 represent identity servers in their various aspects. In embodiments of this invention, each of these identity servers may act in any capacity (for example to provide PDP functionality). In an embodiment, 411 and 421 in their respective counterparts manage other channels in either the same cloud or other disparate, separate, and independent clouds.

There is a trust mechanism between the identity services such that messages may be marshaled between clouds by processes such as 411 and 421 (and their associated counterparts) and processed according to policy because of the identity of the message, the identity of the process emitting or receiving the message, and the identity of the channel carrying the message. In an embodiment, each channel and subchannel acquires an identity from an identity service and, because of the authentication mechanisms and credentials supplied for the instantiation of the identity by the channel and subchannels, the channel and subchannels can be processed by policy and only certain messages allowed on the channel and subchannels because of the identity of those channels and subchannels. In an embodiment, the process (such as 510) also acquires an identity, which allows the process to specify the process identity in each message that is placed on a channel or each request for a message on a sub channel. Likewise, in an embodiment, a process such as 510 may access an identity service to acquire an identity for a message or category of messages, which is to be placed on a channel or some channel so that identity can be interrogated by the channel and/or subchannel to determine whether or not the message will even be allowed to be conducted by the channel or subchannel.

In an embodiment, processes such as 411 and 421 marshal messages across intra-cloud connections such as 412 and 422, 432 and 442, and 452 one 462. This results in the identity of such marshaled messages to be interrogated by processes such as 431, 441, 451, and 461 to determine whether or not messages of such identity should be allowed with in the channels and subchannels that those processes are managing. In an embodiment, processes such as 411, 421, and their associated like processes also provide for guaranteed delivery, message backup, message sequence delivery, etc. as per the identity and policy associated with the identity of each message and the associated channel and subchannel.

Figure 9:
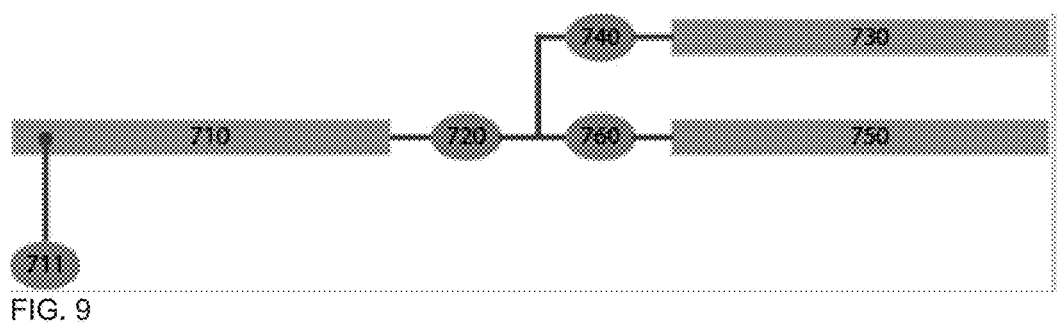
FIG. 9 depicts a higher level abstraction of the FIG. 8, according to an example embodiment.

To continue the discussion, the FIG. 9 is used as a simplification of the FIG. 8, wherein 710 replaces 410 and 420, 720 replaces 411 and 421, and 711 replaces 510, etc. this reduces the complexity of the FIG. 8 while still conveying the techniques presented herein.

Figure 10:
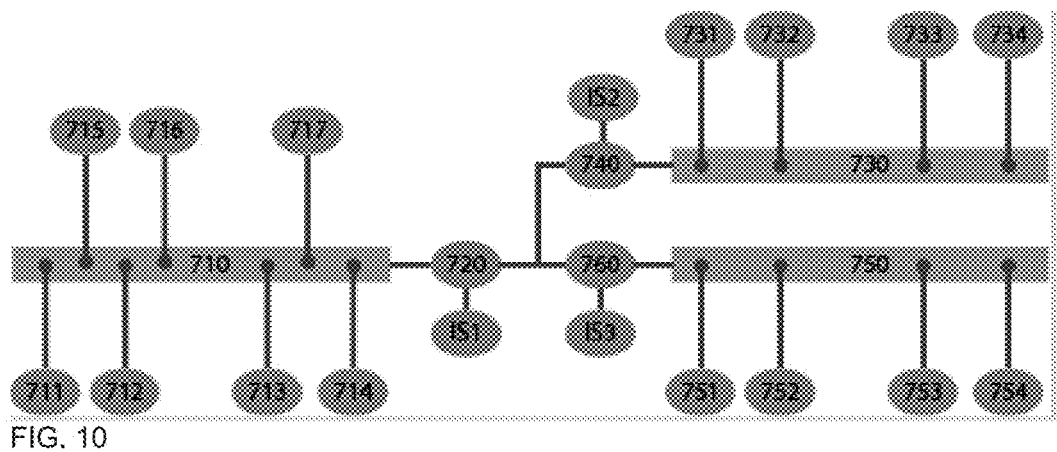
FIG. 10 depicts additional services that are integrated into the cloud environments of the FIG. 9, according to an example embodiment.

Using the FIG. 10, many more processes are added, such as 712, 713, 714, 715, 731, 732, 751, 752, etc. to allow discussion of more embodiments of the invention.

As was discussed earlier, each process such as 711, 751, 731, etc. has a CMDB description which provides for a complete description of the process and/or resource so that the processes such as 720, 740, and 760 can manage the complexity of keeping the configuration described by the CMDB thus if a process such as 715 is started which has a disaster recovery configuration requirement wherein a process such as 732 and 752 must be started to satisfy the configuration requirements, the process 720 may communicate with 740 and 760 and, because of the identity trust which was established when the channels were instantiated, the processes may be started in the other clouds on the appropriate channels with the appropriate identity and trust levels and configurations from the associated CMDB. Likewise, watchdog processes might be associated with each channel and or cloud (e.g., 717, 734, 754), which can monitor the operational status of any process associated with any channel so that if a process or resource becomes nonoperational according to the CMDB description then a managing process such as 720, 740, or 760 might be notified through the channel and appropriate mitigation steps taken. These mitigation steps may cross channel and or cloud boundaries because of the trust relationship that exists between the channels within or between clouds.

In an embodiment, the well structured nature of the channel such as 710 which contains some channels with well defined purposes (as was described earlier) the channel may be monitored for situations occurring between processes and or resources (such as health alerts or processing congestion or network bandwidth problems) wherein those messages may be sent to channels in other clouds even though the messages were not intended to exit the cloud. In this way processes which are not aware of multiple cloud deployments may be made operational for multiple cloud deployments without modification. In this case, mitigation steps may include the starting of processes in other clouds and the routing of traffic to the other clouds so that the issues being monitored may be alleviated. In an embodiment, such mitigation complies with policy because of the identity of the channel, subchannel, message, etc. Likewise, the utilization of trust domains between the various identity servers is also utilized by policy for any mitigation that may take place.

In an embodiment any process in the FIG. 7 may actually be an identity service (such as 715) and is not limited to just those processes labeled as identity services (e.g., IS1). Thus, identity services specific to a task or service category may be attached to a channel and processes specific to that category participate in a specific trust relationship because of their obtaining identities from that specific identity service.

Figure 11:
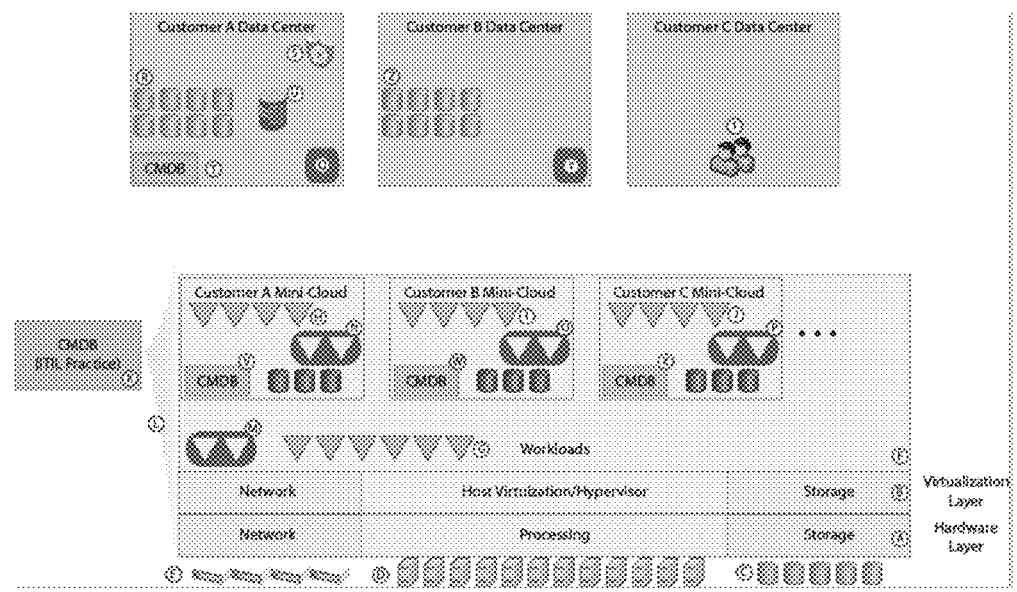
FIG. 11 depicts a component overview of cloud environments and their relationships to one another, according to an example embodiment.

The FIG. 11 shows a schematic of a cloud and data centers and their relationships using a CMDB and a cloud security service (e.g., Q, Y, N, O, P, and M).

Figure 12:
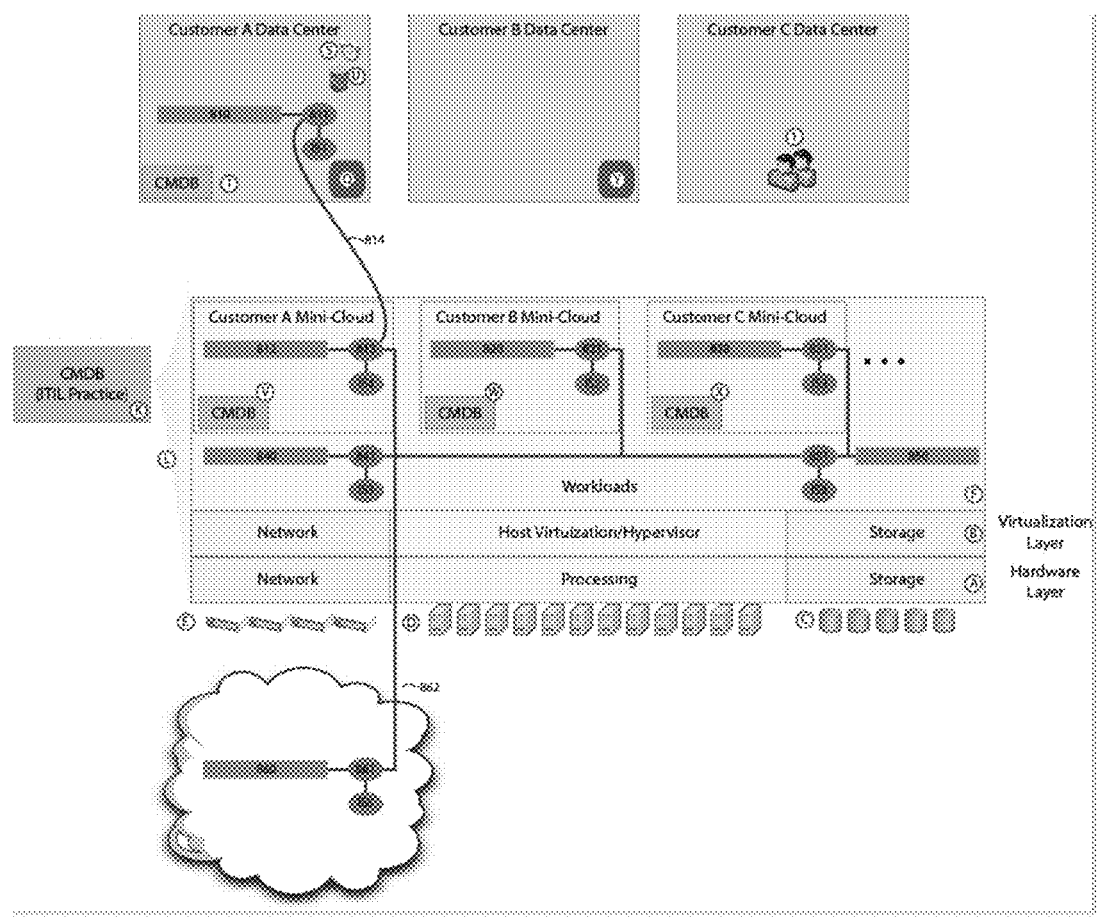
FIG. 12 depicts intra and inter-channel communications occuring with the cloud environments of the FIG. 10, according to an example embodiment.

The FIG. 12 illustrates channel intercom activity between a data center and clouds. Note the existence of two channels within the cloud F labeled 840 and 850. It was mentioned earlier that in an embodiment several channels might exist within the illustration. Also note the existence of several different identity services.

As a point of illustration and clarification, note that Customer A Data Center is utilizing identity service IS1 while a cloud channel is using identity service IS4 in another cloud channel is utilizing IS5. Also note that the CMDB's of K, V and T are coordinated in such a way that the policies and configurations of Customer A and the cloud provider are both honored at the same time or mitigation events are processed. It is also well to note that the usage of the various identity services throughout the interconnection of channels was purposely designed to show the sharing of trust relationships. In particular, Customer A is utilizing IS1, IS4, and IS5. Customer B is utilizing IS2. Customer C is utilizing IS3, which is also utilized by the channels being provided by the cloud provider. Each such utilization of an identity service in conjunction with the sharing of a channel by another channel using a different identity service will require a trust relationship which will thus require policy processing and audit monitoring.

In an embodiment, the aspects of identity, message marshaling, and policy this positioning are all subjects of audit events for various compliance processing and possible mitigation.

With the embodiments of the invention, the complexity of communication between data centers and clouds becomes very manageable and policy driven. Regulatory compliance can be handled quite readily and without undue operational stress.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
resolving, by executable instructions that execute on a hardware processor from a non-transitory computer-readable storage medium, a channel identity for a communication channel for enforcing a policy by obtaining the channel identity as an identity-provider assigned channel identity from an identity provider that authenticates the communication channel in order to process the communication channel as a secure controlled and monitored communication channel and obtaining the policy based on the identity-provider assigned channel identity;
enforcing, by the executable instructions that execute on the hardware processor, the policy for messages being passed: to, over, and from the communication channel based on the channel identity and the messages; and
restricting select ones of the messages from being passed to, over, and from the communication channel and only permitting particular ones of the messages to be processed on the communication channel.

2. The method of claim 1, wherein resolving further includes establishing the channel identity over a second communication channel that is different from the communication channel with the identity provider.

3. The method of claim 2, wherein establishing further includes providing the channel identity to a channel process of a cloud where the messages are received and sent from.

4. The method of claim 3, wherein providing further includes providing the channel identity for the communication channel and providing the policy to the channel process over the second channel.

5. The method of claim 1, wherein enforcing further includes enforcing the policy when passing the messages within a cloud between intra-cloud processes.

6. The method of claim 1, wherein enforcing further includes enforcing the policy when passing the messages between inter-cloud processes of multiple clouds.

7. The method of claim 1, wherein enforcing further includes enforcing the policy when passing the messages within a first cloud between intra-cloud processes and enforcing the policy when passing the messages between inter-cloud processes of the first cloud and at least one second cloud.

8. The method of claim 1, wherein enforcing further includes enforcing identity-based restrictions on the messages in accordance with the policy.

9. The method of claim 8, wherein enforcing further includes blocking any of the messages from being passed over the communication when particular messages fail to conform with the identity-based restrictions.

10. A method, comprising:
intercepting, by executable instructions that execute on a hardware processor from a non-transitory computer-readable storage medium, a message within a cloud that is being attempted to be passed from a sender and is directed to a receiver;
authenticating, by the executable instructions that execute on the hardware processor, the message based on at least:
a message identity for the message, a sender identity for the sender, and a receiver identity for the receiver; and
passing, by the executable instructions that execute on the hardware processor, the message over a pre-designated communication channel within the cloud for communication to the receiver when the message is successfully authenticated based on a channel identity assigned to the pre-designated communication channel, wherein only select messages are permitted to be processed over the pre-designated communication channel.

11. The method of claim 10, wherein intercepting further includes intercepting the message over a port associated with inter-cloud communication.

12. The method of claim 10, wherein intercepting further includes intercepting the message over a port associated with intra-cloud communication within the cloud.

13. The method of claim 10, wherein intercepting further includes detecting a raised event within the cloud and identifying from the event whether the message and the sender are associated with the cloud or with an external cloud that is external to the cloud.

14. The method of claim 10, wherein authenticating further includes obtaining the pre-designated communication channel in response to successfully authenticating the message.

15. The method of claim 10, wherein passing further includes logging metadata associated with successfully authenticating the message, the message identifier, the sender identifier, the receiver identifier, and a channel identifier for the pre-designated communication channel after passing the message.

16. The method of claim 10, wherein passing further includes directing the message over the pre-defined communication channel to a separate processing instance of the method associated with the sender.

17. The method of claim 10 further comprising, publishing capabilities associated with the authentication processing to other external cloud processes.

18. A system, comprising:
- a processor;
- a non-transitory computer-readable storage medium having executable instructions;
- the executable instructions execute on the processor from the non-transitory computer-readable storage medium to perform processing to:
  enforce identity-based authentication on intra-cloud messages and inter-cloud messages based on channel identities assigned to communication channels where the intra-cloud messages and inter-cloud messages are being passed and only permit select ones of the intra-cloud messages and the inter-cloud messages to be processed over the communication channels.

19. The system of claim 18, wherein the executable instructions are further configured to: interact with other instances of the executable instructions independently, each instance of the executable instructions processes a different processor from the processor of the system.

20. The system of claim 18, wherein the executable instructions are further configured to:
  audit each of the messages based on enforcement of an audit policy.

* * * * *